United States Patent
Atmur et al.

(10) Patent No.: US 10,392,094 B2
(45) Date of Patent: Aug. 27, 2019

(54) TRANSMISSIONS FOR ROTATING COAXIAL DRIVE SHAFTS IN OPPOSITE DIRECTIONS

(71) Applicant: The Boeing Company, Chicago, IL (US)

(72) Inventors: Robert J. Atmur, Whittier, CA (US); William Patrick Sargent, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 15/615,628

(22) Filed: Jun. 6, 2017

(65) Prior Publication Data
US 2018/0346086 A1     Dec. 6, 2018

(51) Int. Cl.
| | |
|---|---|
| *F16H 1/32* | (2006.01) |
| *F16H 23/00* | (2006.01) |
| *H02K 7/08* | (2006.01) |
| *H02K 7/116* | (2006.01) |
| *H02K 7/14* | (2006.01) |
| *B63H 23/06* | (2006.01) |
| *B63H 5/10* | (2006.01) |
| *F16H 25/06* | (2006.01) |
| *F16H 37/06* | (2006.01) |

(52) U.S. Cl.
CPC .............. *B63H 23/06* (2013.01); *B63H 5/10* (2013.01); *H02K 7/08* (2013.01); *H02K 7/14* (2013.01); *F16H 25/06* (2013.01); *F16H 37/065* (2013.01)

(58) Field of Classification Search
CPC ......... B63H 23/06; B63H 5/10; F16H 37/065; F16H 25/06; F16H 23/00; F16H 29/02; F16H 29/06; F16H 29/08; F16H 29/10; F16H 29/12; F16H 29/14; F16H 29/16; F16H 29/18; F16H 29/20; F16H 29/22; F16H 33/10; F16H 1/321; H02K 7/116; H02K 7/1116; H02K 7/1163; H02K 7/08
USPC .................................. 475/162–164
See application file for complete search history.

(56) References Cited

U.S. PATENT DOCUMENTS

| | | | |
|---|---|---|---|
| 4,703,670 A | 11/1987 | Kondo | |
| 5,079,754 A * | 1/1992 | Huang | F16H 49/001 368/220 |
| 6,286,391 B1 * | 9/2001 | Gassmann | F16H 48/147 475/164 |
| 6,467,375 B1 | 10/2002 | Ishikawa | |
| 6,799,489 B2 | 10/2004 | Ishikawa | |

(Continued)

*Primary Examiner* — Jeffrey A Shapiro
(74) *Attorney, Agent, or Firm* — Hanley, Flight & Zimmerman, LLC (57) ABSTRACT

Example transmissions for rotating coaxial drive shafts in opposite directions are described herein. An example apparatus includes a first face gear coupled to a first drive shaft, a first elliptically interfacing gear coupled to a second drive shaft and facing toward the first face gear, the second drive shaft disposed within and coaxially aligned with the first drive shaft, and a wobble plate disposed between the first face gear and the first elliptically interfacing gear. The wobble plate has a second face gear on a first side of the wobble plate engaged with the first face gear and a second elliptically interfacing gear on a second side of the wobble plate engaged with the first elliptically interfacing gear. The wobble plate is to rotate the first face gear and the first elliptically interfacing gear in opposite directions.

20 Claims, 7 Drawing Sheets

(56) References Cited

U.S. PATENT DOCUMENTS

| | | | |
|---|---|---|---|
| 8,337,156 B2* | 12/2012 | Khmel | B64C 11/306 |
| | | | 416/27 |
| 2005/0130784 A1* | 6/2005 | Miller | B62M 9/08 |
| | | | 475/164 |
| 2011/0052392 A1* | 3/2011 | Khmel | B64C 11/306 |
| | | | 416/1 |
| 2015/0024896 A1* | 1/2015 | Takahashi | F16H 1/321 |
| | | | 475/162 |
| 2018/0106328 A1* | 4/2018 | Saito | F16H 1/32 |

* cited by examiner

TRANSMISSIONS FOR ROTATING COAXIAL DRIVE SHAFTS IN OPPOSITE DIRECTIONS

FIELD OF THE DISCLOSURE

This disclosure relates generally to coaxial drive shafts and, more particularly, to transmissions for rotating coaxial drive shafts in opposite directions.

BACKGROUND

Counter-rotating propeller systems (sometimes referred to as contra-rotating propeller systems) include two propellers that are rotated in opposite directions about a common axis. Counter-rotating propeller systems are used in many industries, such as in the aerospace industry (e.g., on fixed-wing aircraft, helicopters, etc.), for water travel (e.g., on torpedoes, boats, etc.), for pumping systems, on ducted fans, etc. Counter-rotating propeller systems are often desirable because they are more efficient than single-propeller systems. To drive the propellers in opposite directions, a counter-rotating propeller system utilizes a transmission having two coaxial output shafts. An outer output shaft is connected to the second (downstream) propeller, and an inner output shaft extends through the outer output shaft and is connected to the first (upstream) propeller in front of the second propeller. The transmission drives the output shafts in opposite directions, which rotates the propellers in opposite directions about the common axis.

SUMMARY

An example apparatus disclosed herein includes a first face gear coupled to a first drive shaft, a first elliptically interfacing gear coupled to a second drive shaft and facing toward the first face gear, the second drive shaft disposed within and coaxially aligned with the first drive shaft along a rotational axis, and a wobble plate disposed between the first face gear and the first elliptically interfacing gear. The wobble plate has a second face gear on a first side of the wobble plate engaged with the first face gear and a second elliptically interfacing gear on a second side of the wobble plate engaged with the first elliptically interfacing gear. The wobble plate is to rotate the first face gear and the first elliptically interfacing gear in opposite directions.

An example counter-rotating propeller system disclosed herein includes a first propeller and a second propeller rotatable about a common rotational axis and a transmission to rotate the first propeller and the second propeller in opposite directions. The transmission includes a first drive shaft coupled to the first propeller, a second drive shaft coupled to the second propeller, and a wobble plate disposed between the first drive shaft and the second drive shaft. The example counter-rotating propeller system also includes a power source to move the wobble plate in a circular wobbling motion to rotate the first and second drive shafts in opposite directions.

An example apparatus disclosed herein includes a first face gear facing a first elliptically interfacing gear and a wobble plate disposed between the first face gear and the first elliptically interfacing gear. The wobble plate has a second face gear on a first side of the wobble plate engaged with the first face gear and a second elliptically interfacing gear on a second side of the wobble plate engaged with the first elliptically interfacing gear. The first face gear and the second face gear have the same number of teeth and the second elliptically interfacing gear has more teeth than the first elliptically interfacing gear.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Counter-rotating propeller systems include two propellers that are coaxially aligned along a common rotational axis and driven in opposite directions. As used herein, the terms "counter-rotating," counter-rotation," "contra-rotating," and "contra-rotation" (and variations thereof) may be used interchangeably, and when used in connection with describing the motion of propellers, drive (output) shafts, and/or any other structures, are defined to mean the propellers, drive shafts or other structures are rotated in opposite directions about a common axis (coaxial). Counter-rotating propeller systems are used in many industries, such as in the aerospace industry (e.g., on fixed-wing aircraft, helicopters, etc.), for water aviation (e.g., on torpedoes, boats, etc.), for pumping systems, on ducted fans, etc.

Counter-rotating propeller systems are often desirable because they more efficient than single-propeller systems. For example, the air flowing through the first (upstream) propeller causes a significant amount of tangential or rotational air flow. The energy of this tangential air flow is generally wasted in a single-propeller system. However, with a counter-rotating propeller system, the second (downstream) propeller uses this disturbed air flow to create thrust, while at the same time redirecting the air flow back to the original, rearward direction. Thus, counter-rotating propeller systems produce a smoother fluid flow that is generally more efficient and capable of producing higher thrusts than single-propeller systems. Further, the second (downstream) propeller serves to counter the asymmetrical torque effect that is typically produced by a single-propeller system. Thus, counter-rotating propeller systems are desired in various applications.

However, the transmissions or gearboxes for producing counter-rotating motion are often complicated and expensive to manufacture. For instance, to drive the propellers in opposite directions, a counter-rotating propeller system typically utilizes a transmission having two coaxial output shafts. An outer output shaft is connected to the second (downstream) propeller, and an inner output shaft extends through the outer output shaft and is connected to the first (upstream) propeller in front of the second propeller. The transmission drives the output shafts in opposite directions, thereby rotating the propellers in opposite directions. Some known transmissions utilize separate motors and gear assemblies that are independent from each other but synchronized to rotate the output shafts simultaneously. However, these systems require an additional motor and additional gear trains to drive each output shaft and, thus, are generally heavier, more complex, and more expensive to manufacture. Other known transmissions derive rotating power from a single input shaft and use a complex system of gears (such as a planetary gear system) to drive the inner and outer output shafts in opposite directions. These known transmissions also require many parts and are expensive to manufacture and assemble. Further, with such a large number of gears, these known transmissions are often noisy. Moreover, known transmissions for counter-rotating propellers only work if both propellers (and the output shafts) are functional. If one of the output shafts or propellers becomes jammed or stuck, the entire transmission fails and no torque or rotational motion is transferred to the other output shaft or propeller.

Disclosed herein are example transmissions for rotating coaxial drive shafts in opposite directions and which may be utilized in counter-rotating propeller systems. Example transmissions disclosed herein utilize a less complex gear arrangement that provides equal and opposite torque and speed to both counter-rotating shafts. In some examples, only a single-driven element is used to rotate the drive shafts in opposite directions. Further, example transmissions disclosed herein continue to apply torque and rotational motion to one of the shafts even if the other shaft is jammed or stuck. Thus, example transmissions disclosed herein advantageously enable a propeller system to operate even when one of the shafts has failed and/or otherwise cannot rotate.

Example transmissions disclosed herein utilize a wobble plate (which may be referred to as an Euler plate or virtual elliptical drive) to achieve counter-rotating motion of two, coaxial drive shafts and produces equal and opposite torque. The wobble plate is disposed between a first face gear and a first elliptically interfacing gear. The first face gear is coupled to an outer drive shaft and the first elliptically interfacing gear is coupled to an inner drive shaft that extends through and outward from the outer drive shaft. The wobble plate has a first side with a second face gear facing the first face gear and a second side, opposite the first side, with a second elliptically interfacing gear facing the first elliptically interfacing gear. The wobble plate is driven (e.g., via a motor) in a circular wobbling motion. As used herein, the terms "cyclical wobbling motion" or "circular wobbling motion" (or any variation thereof) may be used interchangeably and are defined to mean an axial precession motion in which a central axis of a an object (e.g., a plate) is tilted or angled relative to another axis extending through a center of the object and moves in a circular motion about the other axis. When the wobble plate is viewed from along the Z axis (e.g., the rotational and/or central axis extending through a center of the plate), the image of the wobble plate undergoes procession. The physical wobble plate undergoes a coordinated and synchronous rotation about the X and Y axes. As the wobble plate moves in the circular wobbling motion, a portion of the second face gear on the first side of the wobble plate is engaged with a portion of the first face gear, and a portion of the second elliptically interfacing gear on the second side of the wobble plate is engaged with a portion of the first elliptically interfacing gear. In some examples, this circular wobbling motion causes the wobble plate to also rotate (spin) about its central axis, which drives the first face gear and, thus, rotates the first drive shaft in one direction. Additionally, the circular wobbling motion drives the first elliptically interfacing gear in an opposite direction and, thus, rotates the second drive shaft in the opposite direction relative to the first drive shaft.

Therefore, in some examples, the example transmission uses a single driven element (the wobble plate) to rotate the drive shafts in opposite directions. As such, this single-stage type transmission is generally smaller, lighter and less complex than known transmissions. Thus, the example transmissions can be more easily utilized in various applications. Also, because the example transmissions use fewer gears than known transmissions, the example transmissions are less expensive and easier to manufacture. Further, because the example transmissions use fewer gears than known transmissions (and, thus, generate less noise due to interaction between the gears), the example transmissions disclosed herein are quieter, which is more desirable in certain fields such as low-noise commercial aviation and/or low noise underwater exploration. Also, the example wobble plate can provide greater torque than known planetary gears.

Moreover, the example transmissions disclosed herein maintain the same torque to each of the drive shafts independent of the load on each drive shaft. Thus, the example transmissions can provide equal torque to the propellers of a counter-rotating propeller system. Further, if one of the drive shafts (or propellers) becomes jammed or stuck, the other drive shaft (and its propeller) is not impacted. In particular, the work previously going to the jammed shaft is instantly transitioned to the other shaft as a gear reaction force (which may be considered as "virtual" work). Thus, unlike known transmissions that fail to drive the other drive shaft when one of the drive shafts fails, the example transmissions can continue to provide power to the other drive shaft, thereby enabling the propeller system to operate even when one of the propellers is inoperable.

Figure 1:
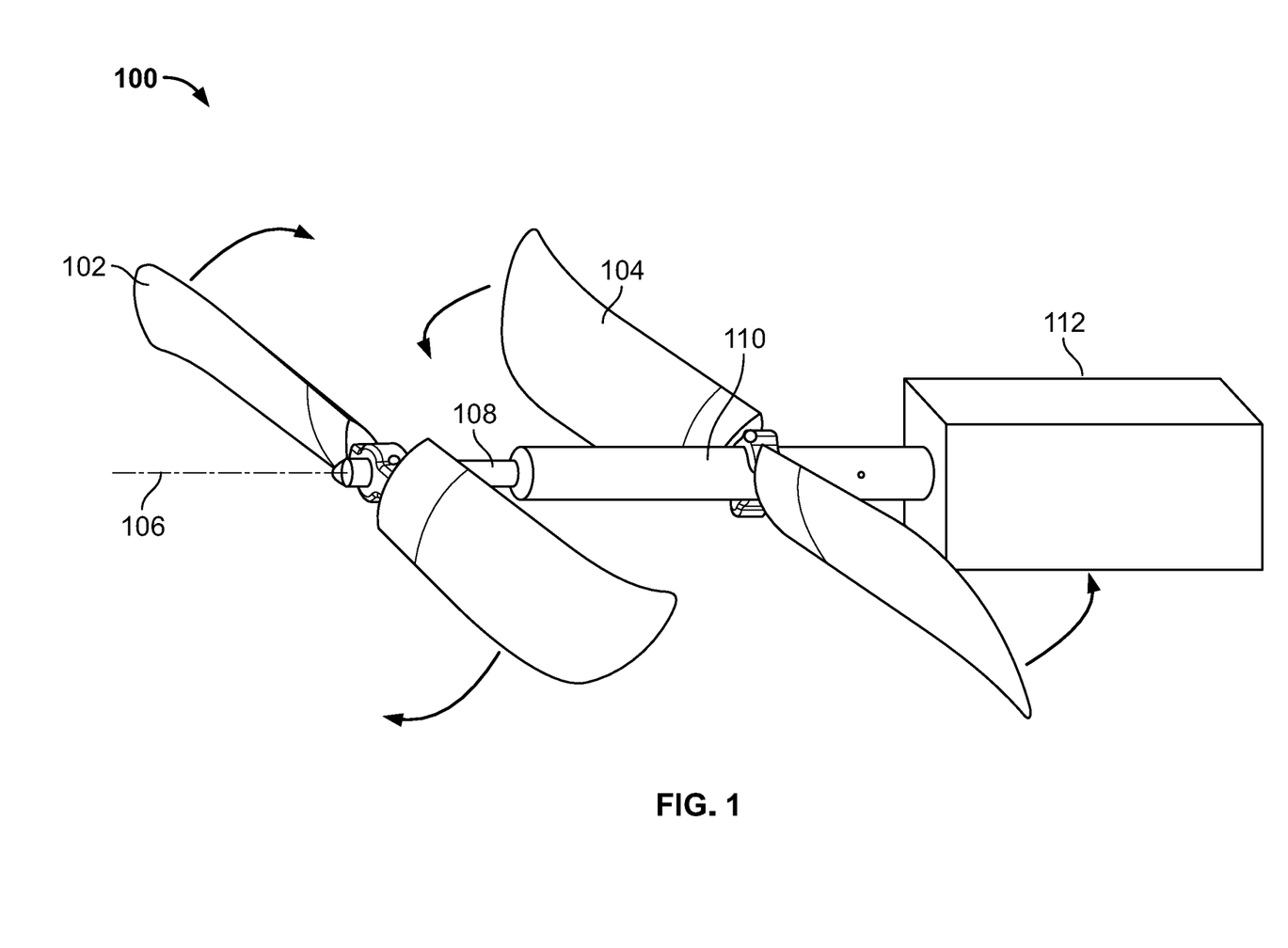
FIG. 1 illustrates an example counter-rotating propeller system in which example transmissions disclosed herein may be implemented.

FIG. 1 illustrates an example counter-rotating propeller system 100 in which the examples disclosed herein may be implemented. The propeller system 100 includes a first propeller 102 and a second propeller 104 that are rotatable about a common rotational axis 106. In the illustrated example, each of the first propeller 102 and the second propeller 104 includes two rotor blades. However, in other examples, the first propeller 102 and/or the second propeller 104 may include more or fewer rotor blades. The first propeller 102 is coupled to and driven by an inner drive shaft 108 and the second propeller 104 is coupled to and driven by an outer drive shaft 110. The inner and outer drive shafts 108, 110 are coaxially aligned and are driven in opposite directions. As a result, the first propeller 102 and the second propeller 104 rotate in opposite directions (as indicated by the curved arrows).

In general, in addition to forcing air flow in the rearward direction, the first propeller 102 also causes a significant amount of tangential or rotational air flow exiting the first propeller 102. In a single-propeller system, this energy is wasted. However, in a counter-rotating propeller system, such as the propeller system 100, the second propeller 104, which is downstream of the first propeller 102, takes advantage of the disturbed air flow. Thus, the first propeller 102 spins or rotates the air in one direction, and the second propeller 104 uses the rotating air to generate thrust while also re-directing the air flow back to the original, rearward direction. In some instances, the propeller system 100 has no rotational air flow exiting the second propeller 104. As a result, the propeller system 100 can push a maximum amount of air uniformly through the first and second propellers 102, 104. This results in high performance and low induced energy losses. Further, unlike the asymmetrical torque effect experienced by a single-propeller system, the body or vehicle supporting the propeller system 100 experiences little or no asymmetrical torque effect. In other words, the torque on the body or vehicle usually experienced with a single propeller system is effectively cancelled out when using a second, counter-rotating propeller.

As illustrated in the example of FIG. 1, the inner drive shaft 108 is coaxial with the outer drive shaft 110. In particular, the inner drive shaft 108 extends through and outward from a tip of the outer drive shaft 110. The inner and outer drive shafts 108, 110 are coupled to and driven by a drive apparatus 112. The drive apparatus 112 may include a power source, such as an electric motor, a combustion engine, etc., that provides power via a rotating input shaft, and a transmission (e.g., a gearbox) that converts the rotating power to rotate the inner and outer drive shafts 108, 110 in opposite directions. Depending the application of the example propeller system 100, the drive apparatus 112 may be powered by various power sources. For example, if the propeller system 100 is implemented on a fixed-wing aircraft, the propeller system 100 may be driven by an internal combustion engine or a jet engine.

Figure 2:
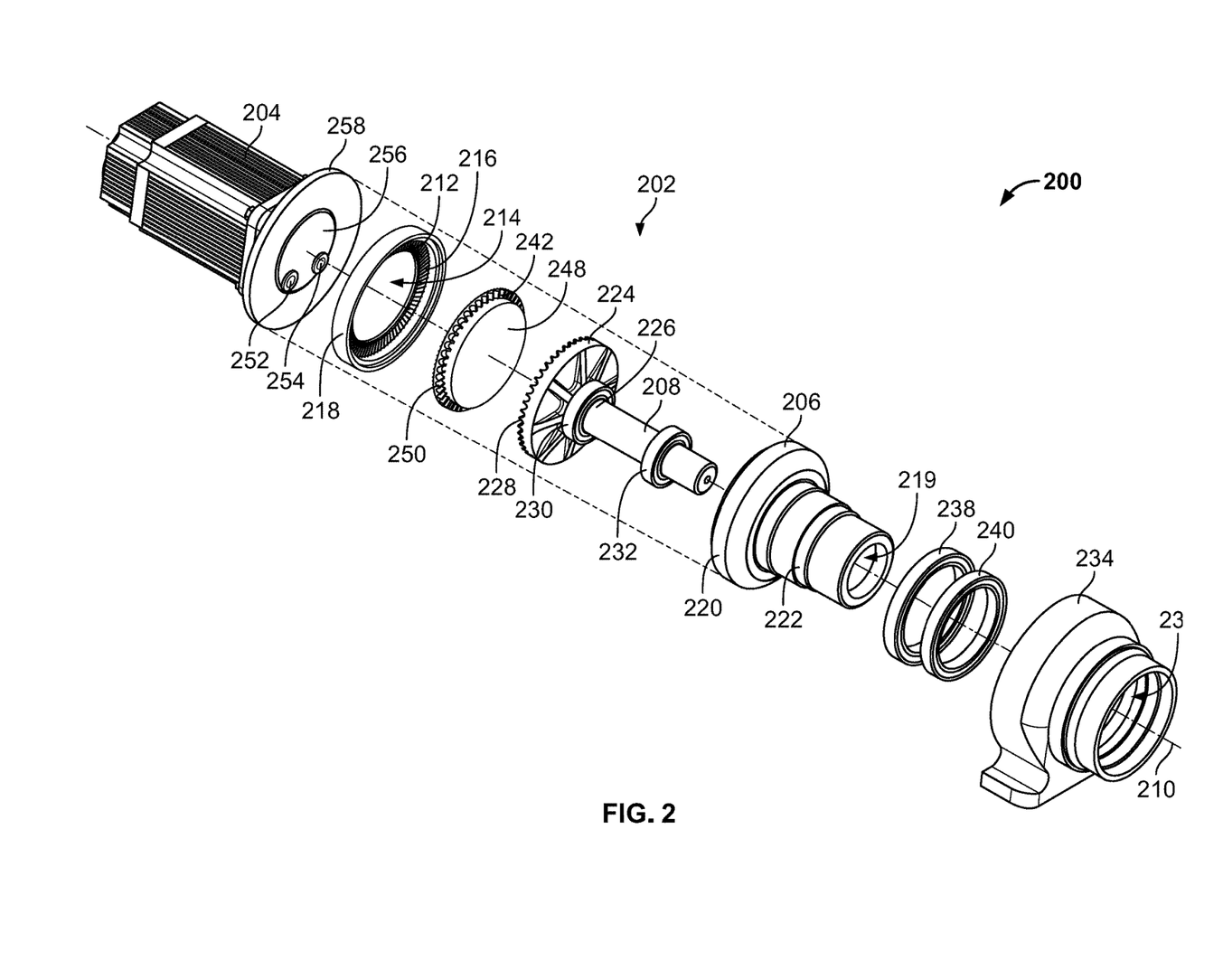
FIG. 2 is an exploded perspective view of an example drive apparatus including an example power source and an example transmission that may be implemented with the example counter-rotating propeller system of FIG. 1.
Figure 3:
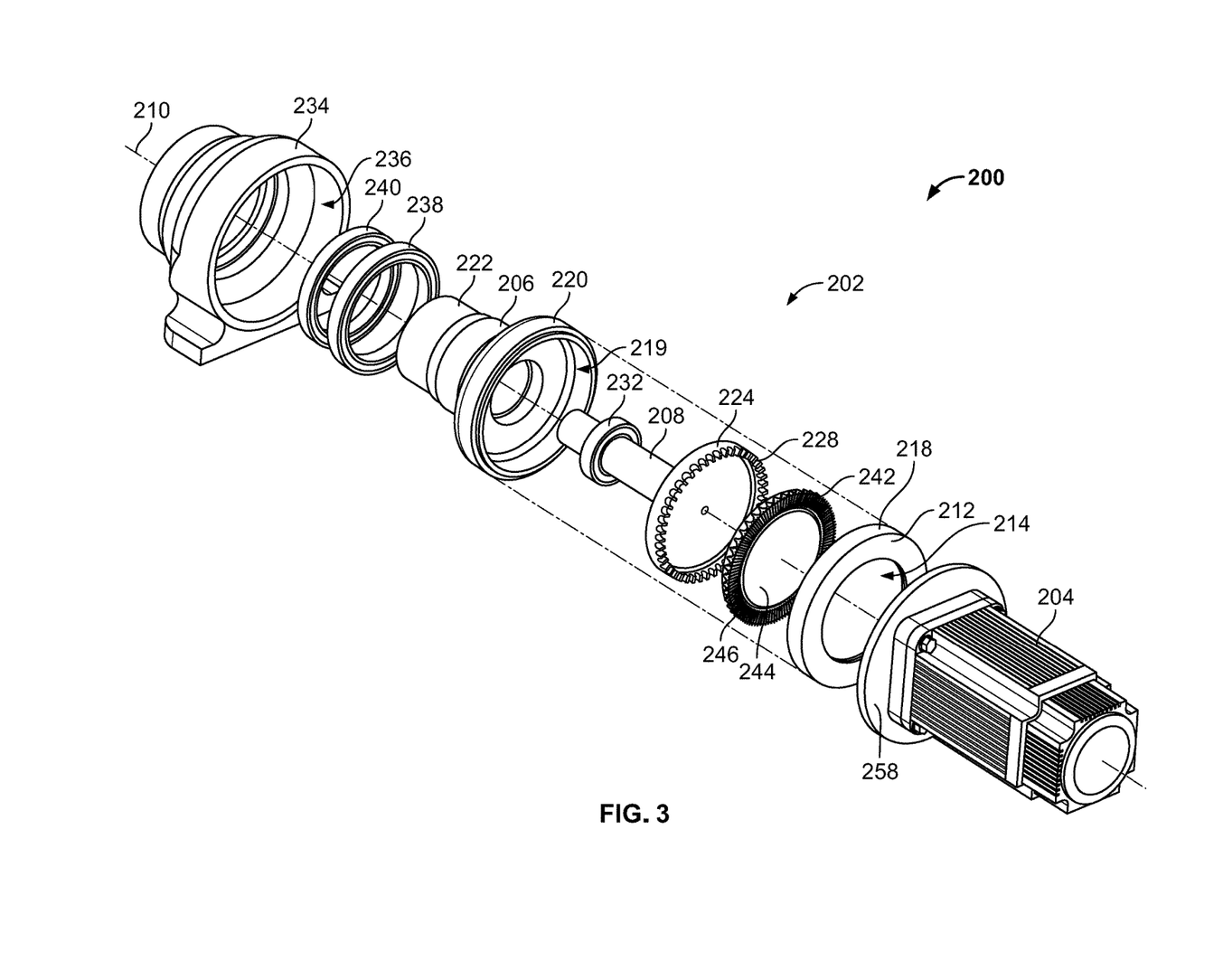
FIG. 3 is another exploded perspective view of the example drive apparatus of FIG. 2.

FIGS. 2 and 3 illustrate an example drive apparatus 200 constructed in accordance with one or more principles of this disclosure. In particular, FIG. 2 is an exploded perspective view of the example drive apparatus 200 from one side and FIG. 3 is an exploded perspective view of the example drive apparatus 200 from the opposite side. The example drive apparatus 200 may be implemented as the drive apparatus 112 of FIG. to power the example propeller system 100. The drive apparatus 200 includes a transmission 202 (sometimes referred to as a gearbox, gear train, etc.) that uses rotating power from a power source 204 to rotate two, coaxial drive shafts in opposite directions.

In the illustrated example of FIGS. 2 and 3, the transmission 202 includes a first drive shaft 206 and a second drive shaft 208, which may be referred to as a counter-rotating output shaft and a counter-rotating reaction output shaft, respectively. The first drive shaft 206 may correspond to, for example, the outer drive shaft 110 of the propeller system 100 in FIG. 1 or the first drive shaft 206 may be coupled, directly or indirectly, to the outer drive shaft 110 (e.g., the outer drive shaft 110 of FIG. 1 may be an extension of the first drive shaft 206 of FIGS. 2 and 3). Likewise, the second drive shaft 208 may correspond to the inner drive shaft 108 of the propeller system 100 of FIG. 1 or the second drive shaft 208 may be coupled, directly or indirectly, to the inner drive shaft 108 (e.g., the inner drive shaft 108 of FIG. 1 may be an extension of the second drive shaft 208 of FIGS. 2 and 3). The second drive shaft 208 extends through the first drive shaft 206 and the first and second drive shafts 206, 208 are to rotate in opposite directions. As such, the drive apparatus 200 may be used to rotate propellers, such as the first and second propellers 102, 104 (FIG. 1), in opposite directions.

When the transmission 202 is assembled, the second drive shaft 208 is disposed in and rotatable within the first drive shaft 206. The first and second drive shafts 206, 208 are coaxial and rotate about a common rotational axis 210, which is aligned with the central or longitudinal axes of the first and second drive shafts 206, 208. The example transmission 202 uses rotational power from the power source 204 to rotate the first drive shaft 206 in one direction and/or the second drive shaft 208 in an opposite direction. In the illustrated example, the power source 204 is implemented as an electric motor (e.g., a brushless direct-current (DC) motor). However, in other examples, the power source 204 may be any other source of rotational power, such as an aircraft engine (e.g., an internal combustion engine, a jet engine, etc.), a helicopter engine, a torpedo motor (which may be powered by compressed air, heat, batteries, etc.), etc. In some examples, the power source 204 provides up to about 75 horsepower (HP). In other examples, the power source 204 may be sized to provide more power (e.g., 100 HP, 200 HP, etc.) or less power (e.g., 50 HP, 25 HP, etc.).

In the illustrated example of FIGS. 2 and 3, the transmission 202 includes a first face gear 212 (seen more clearly in FIG. 2). In the illustrated example, the first face gear 212 is a ring-shaped disk defining an opening 214 and includes a set of teeth 216 (FIG. 2) extending from a face of the disk. In the illustrated example, a rim 218 extends outward from a peripheral edge of the first face gear 212 in a direction parallel to the axis 210. The first face gear 212 is to be coupled to the first drive shaft 206. In the illustrated example, the first drive shaft 206 is a cylindrical tube with an opening 219 (e.g., a channel, a passage, etc.). The first drive shaft 206 includes a first section 220 having a larger diameter and a second section 222 with a smaller diameter. When the transmission 202 is assembled, the first face gear 212 is coupled to the first drive shaft 206 (e.g., the first face gear 212 and the first drive shaft 206 form a substantially unitary part or component). In particular, the first section 220 of the first drive shaft 206 and the rim 218 on the first face gear 212 are to be coupled, which forms a cavity therebetween. The rim 218 of the first face gear 212 and the first section 220 of the first drive shaft 206 may be coupled via any mechanical and/or chemical coupling techniques (e.g., via welding, an adhesive, one or more mechanical fasteners, such as bolts, etc.).

Figure 4:
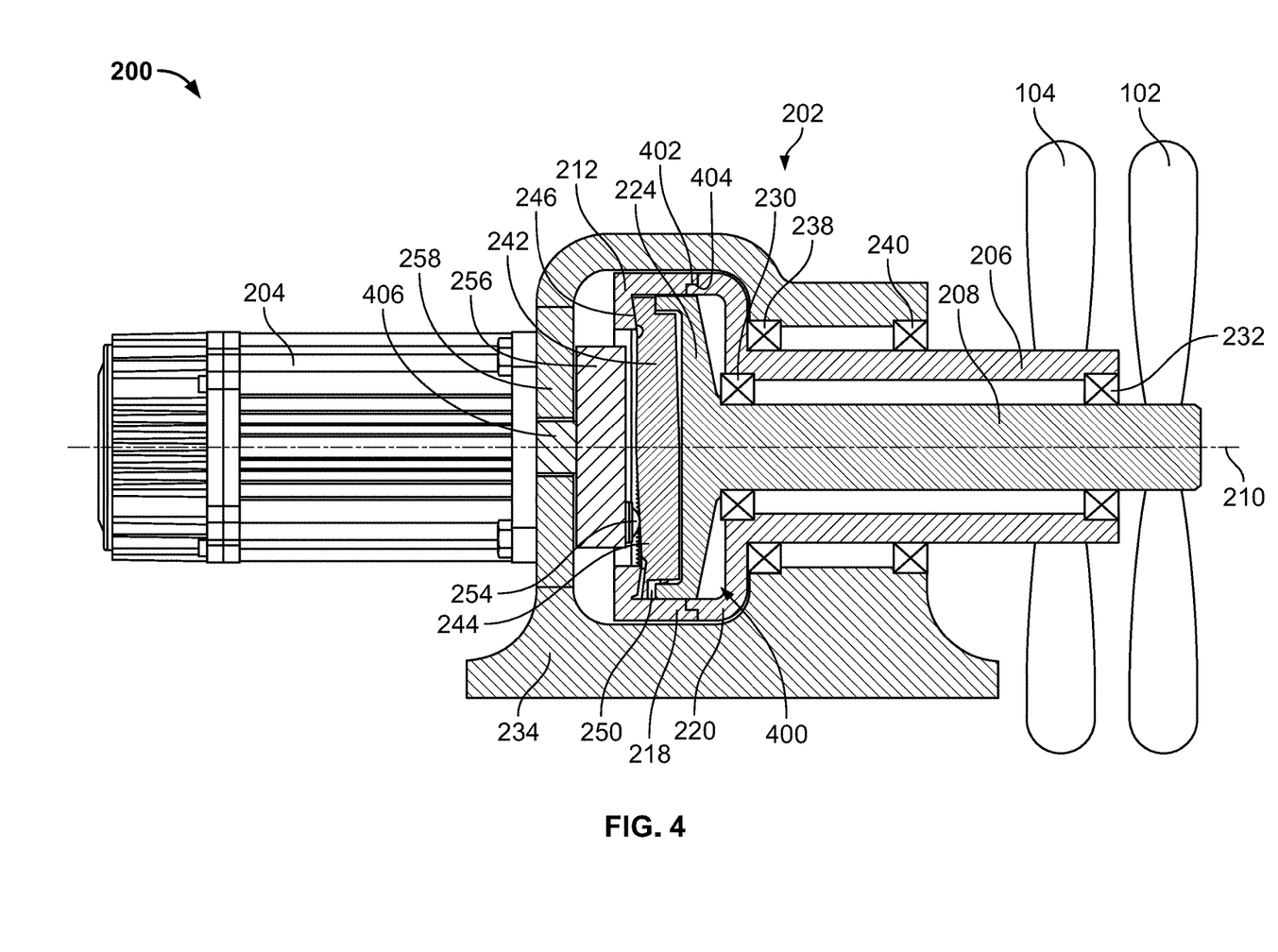
FIG. 4 is a partial cross-sectional view of the example drive apparatus of FIG. 2 in an assembled state.
Figure 5A:
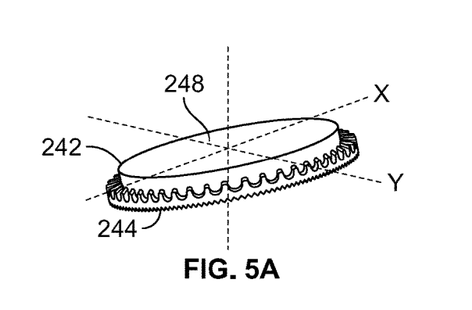
FIGS. 5A-5H illustrate an example circular wobbling motion imparted in an example wobble plate that may be used in the example transmission of FIG. 2.
Figure 5B:
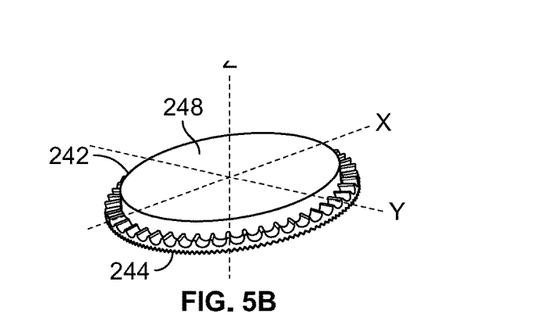
Figure 5C:
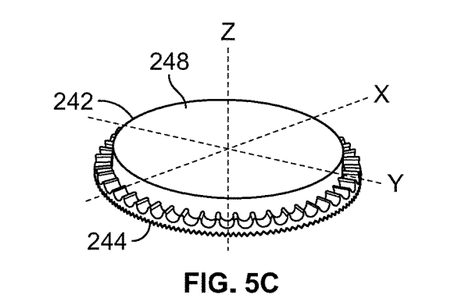
Figure 5D:
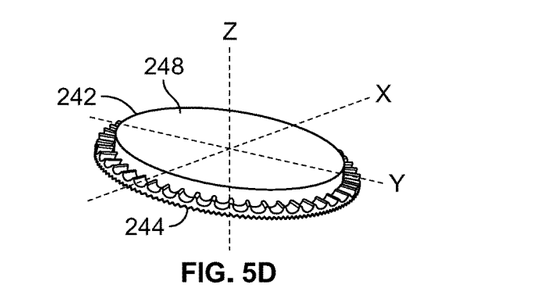
Figure 5E:
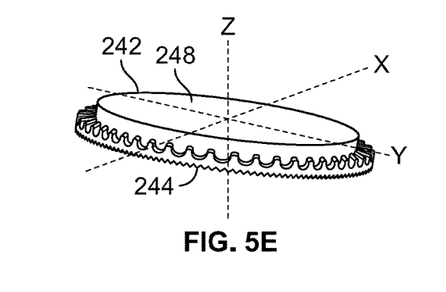
Figure 5F:
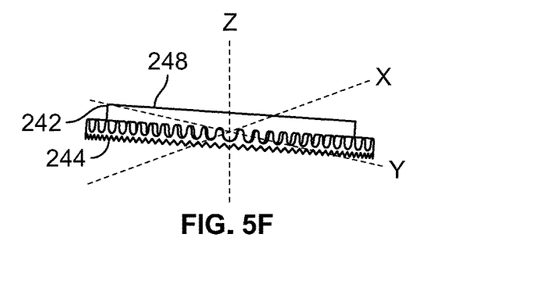
Figure 5G:
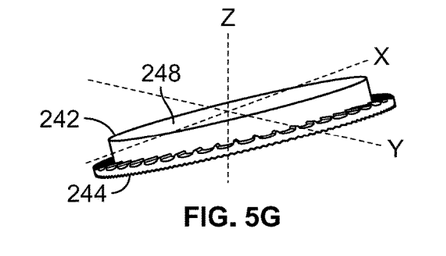
Figure 5H:
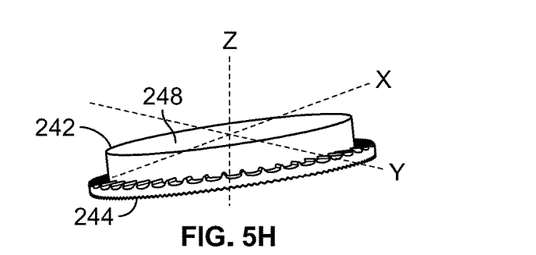

Turning briefly to FIG. 4, a partial cross-sectional view of the example drive apparatus 200 in an assembled state is shown. As illustrated in FIG. 4, the first face gear 212 and the first drive shaft 206 are coupled together to define a cavity 400. One or more other components of the transmission 202 may be disposed in the cavity 400 as disclosed in further detail herein. In the illustrated example, the rim 218 of the first face gear 212 includes a lip or ledge 402 that engages a matching lip or ledge 404 on the first section 220 of the first drive shaft 206. In other examples, no lip or ledge may be formed in these parts.

Referring back to FIGS. 2 and 3, the transmission 202 includes a first elliptically interfacing gear 224. The first elliptically interfacing gear 224 is coupled to an end 226 (FIG. 2) of the second drive shaft 208 (e.g., the first elliptically interfacing gear 224 and the second drive shaft 208 form a substantially unitary part or component). The first elliptically interfacing gear 224 is a disk having a set of teeth 228 extending from a face of the disk. The first elliptically interfacing gear 224 faces toward the first face gear 212. When the example transmission 202 is assembled, as illustrated in FIG. 4, the first elliptically interfacing gear 224 is disposed within the cavity 400 formed by the first face gear 212 and the first section 220 of the first drive shaft 206. In the illustrated example of FIGS. 2, 3 and 4, the transmission 202 includes a first bearing 230 and a second bearing 232 that are to be disposed between the first and second drive shafts 206, 208 to enable the first and second drive shafts 206, 208 to rotate smoothly in opposite directions. In the illustrated the example, the first and second bearings 230, 232 are implemented as ball bearings. However, in other examples, the transmission 202 may include more (e.g., three, four, etc.) or fewer (e.g., one) bearings between the first and second drive shafts 206, 208 and/or the bearing(s) may be implemented as other types of bearings, such as needle bearings, plain or journal bearings, etc.

Referring to FIGS. 2 and 3, the example transmission 202 includes a housing 234. The first and second drive shaft 206, 208 are to extend through an opening 236 formed through the housing 234. In the illustrated example, the transmission 202 includes a third bearing 238 and a fourth bearing 240 that are to be disposed between the second section 222 of the first drive shaft 206 and the housing 234, which enables the first drive shaft 206 to rotate smoothly relative to the housing 234. In the illustrated the example, the third and fourth bearings 238, 240 are implemented as ball bearings. However, in other examples, the transmission 202 may include more (e.g., three, four, etc.) or fewer (e.g., one) bearings between the first drive shaft 206 and the housing 234 and/or the bearing(s) may be implemented as other types of bearings, such as needle bearings, plain or journal bearings, etc.

The housing 234 and the third and fourth bearings 238, 240 can also be seen in FIG. 4. Further, as depicted in FIG. 4, the first and second drive shafts 206, 208 extend outward from the housing 234. The second propeller 104 is coupled to an end of the first drive shaft 206 (the outer drive shaft), and the first propeller 102 is coupled to an end of the second drive shaft 208 (the inner drive shaft), which extends outwardly beyond the end of the first drive shaft 206. The first and second drive shafts 206, 208 are driven in opposite directions, which rotates the first and second propellers 102, 104 in opposite directions.

To rotate the first face gear 212 and the first elliptically interfacing gear 224 in opposite directions (and, thus, rotate the first drive shaft 206 and the second drive shaft 208 in opposite directions), the example transmission 202 includes a plate 242, referred to herein as a wobble plate 242, which is illustrated in FIGS. 2, 3 and 4. When the transmission 202 is assembled, as illustrated in FIG. 4, the wobble plate 242 is disposed between the first face gear 212 and the first elliptically interfacing gear 224 in the cavity 400 formed by the first face gear 212 and the first section 220 of the first drive shaft 206. Thus, the wobble plate 242 is disposed between the first drive shaft 206 and the second drive shaft 208.

Referring back to FIGS. 2 and 3, the wobble plate 242 has a first side 244 (FIG. 3) with a second face gear 246 (e.g., a gear track) facing the first face gear 212 and a second side 248 (FIG. 2), opposite the first side 244, with a second elliptically interfacing gear 250 (e.g., a gear track) facing the first elliptically interfacing gear 224. At least a portion of the second face gear 246 is to engage (e.g., mesh with) the teeth 216 of the first face gear 212, and at least a portion of the second elliptically interfacing gear 250 is to engage (e.g., mesh) the teeth 228 of the first elliptically interfacing gear 224 to rotate the first face gear 212 and the first elliptically interfacing gear 224 in opposite directions, as disclosed in further detail herein. In the illustrated example, the second face gear 246 has the same type (e.g., shape) of teeth as the teeth 216 of the first face gear 212. Likewise, the second elliptically interfacing gear 250 has the same type of teeth as the teeth 228 of the first elliptically interfacing gear 224. However, the second face gear 246 and the first face gear 212 have a different type of teeth than the second elliptically interfacing gear 250 and the first elliptically interfacing gear 224. For instance, in the illustrated example of FIGS. 2 and 3, the second face gear 246 and the first face gear 212 have face gear teeth that are more triangularly shaped, with a lower tooth depth and less space between adjacent teeth. These teeth act as a constant velocity joint that enables the wobble plate 242 to rotate the first face gear 212 at the same rotational speed as the wobble plate 242. Whereas the second elliptically interfacing gear 250 and the first elliptically interfacing gear 224 have relatively larger teeth (elliptically interfacing teeth) with a larger tooth depth and more space between adjacent teeth. These teeth are designed to engage and slide against each other to create a reaction torque, which forces the wobble plate 242 and the first elliptically interfacing gear 224 to move in opposite directions, as disclosed in further detail herein. In other examples, the first face gear 212, the first elliptically interfacing gear 224, the second face gear 246, and/or the second elliptically interfacing gear 250 may have the same or different shaped teeth (e.g., all of the teeth may be elliptically interfacing teeth). As disclosed in further detail, the wobble plate 242 is driven in circular wobbling motion within the cavity 400 to rotate the first face gear 212 and the first elliptically interfacing gear 224 in opposite directions.

To create a circular wobbling motion in the wobble plate 242, the example transmission 202 includes a first rolling element 252 and a second rolling element 254, as illustrated in FIG. 2. As illustrated in FIG. 2, the first and second rolling elements 252, 254 are coupled to and extend from an input drive plate 256. In the illustrated example, the input drive plate 256 is aligned with and rotatable (e.g., via the power source 204) about the axis 210. When the transmission 202 is assembled, the first and second rolling elements 252, 254 extend through the opening 214 in the first face gear 212 and engage the first side 244 (FIG. 3) of the wobble plate 242. In some examples, the first rolling element 252 and second rolling element 254 are single ball bearing rollers (sometimes referred to as a cup roller or pot roller), which enables the first and/or second rolling elements 252, 254 to roll against the first side of the wobble plate 242. In other examples, the first rolling element 252 and/or the second rolling element 254 may be fixed surfaces (e.g., a semispherical surface) that are relatively smooth to slide against the first side 244 of the wobble plate 242. In the illustrated example, the first and second rolling elements 252, 254 are offset (distanced) from a central axis of the wobble plate 242 and the axis 210. As such, when the input drive plate 256 is rotated, the first and second rolling elements 252, 254 are rotated in a circular path about the central axis of the wobble plate 242 and/or the axis 210. The first and second rolling elements 252, 254 are relatively close to each other, which causes the central axis of the wobble plate 242 to tilt with respect to the axis 210. The first and second rolling elements 252, 254 slide and/or roll against the first side 244 (FIG. 3) of the wobble plate 242, which causes the wobble plate 242 to move in a circular wobbling motion. In some examples, using two roller elements minimizes cantilever loads and supports true running of the first and second drive shafts 206, 208. In other examples, the transmission 202 may include only one rolling element or more than two rolling elements.

In the illustrated example of FIGS. 2 and 3, the power source 204 includes a mounting plate 258, which may be coupled to the housing 234 to contain the transmission 202 therein. For example, as illustrated in FIG. 4, the mounting plate 258 is coupled to the housing 234, which forms an enclosure to contain the parts of the transmission 202. In the illustrated example of FIG. 4, the second rolling element 254 is engaged with the first side 244 of the wobble plate 242 (near a bottom of the wobble plate 242 in FIG. 4). As a result, the edge of the wobble plate 242 near the second rolling element 254 is pushed into the first elliptically interfacing gear 224 and the opposite edge of the wobble plate 242 (furthest from the second rolling element 254) is pivoted backward and pushed into the first face gear 212. Thus, the central axis of the wobble plate 242 is angled or titled with respect to the axis 210. In the illustrated example of FIG. 4, the input drive plate 256 is driven by the power source 204, which is implemented by an electric motor. In particular, the input drive plate 256 is coupled to and rotated by an output shaft 406 of the electric motor. In other examples, the power source 204 may be any other source of rotational motion, such as an aircraft engine (e.g., an internal combustion engine, a turboprop engine, etc.), a helicopter engine, an outboard or inboard watercraft engine, a torpedo motor (which may be powered by compressed air, heat, electric batteries, etc.), etc., which may be used to rotate the input drive plate 256. For example, the output shaft 406 may correspond to the crankshaft or other drive shaft of an internal combustion engine.

While the wobble plate 242 may be engaged with different sections of the first face gear 212 and/or the first elliptically interfacing gear 224, in this example, the wobble plate 242 is not fixedly attached to any other parts. Further, the power source 204 does not directly spin or rotate the wobble plate 242. Instead, the power source 204 causes the wobble plate 242 to move in a circular wobbling motion, which drives the first face gear 212 and the first elliptically interfacing gear 224 in opposite directions (and which may result in the wobble plate 242 rotating or spinning about its central axis). Further, neither the first face gear 212 nor the first elliptically interfacing gear 224 is directly coupled to the power source 204.

As mentioned above, as the input drive plate 256 is rotated, the first and second rolling elements 252, 254 are rotated in a circular path around the axis 210, which imparts a circular wobbling motion in the wobble plate 242. FIGS. 5A-5H illustrate an example cycle of a circular wobbling motion performed by the wobble plate 242 with one rotation of the first and second rolling elements 252, 254 around the axis 210. The wobble plate 242 and its movement can be defined about the XYZ axes. In the illustrated example, the Z axis corresponds to the axis 210 (FIGS. 2 and 3). The wobble plate 242 is rotated (tilted or pivoted) back-and-forth or up-and-down about the X and Y axes, which creates a circular wobbling motion that travels around wobble plate 242 at a fixed angle. In the illustrated example of FIGS. 5A-5H, the wobble plate 242 does not spin or rotate about its central axis (although the wobble plate 242 may be caused to rotate about its central axis via interaction with the first face gear 212 and/or the first elliptically interfacing gear 224 as disclosed in further detail herein). Instead, the wobble plate 242 only wobbles or tilts about the X and Y axes. As the first and second rolling elements 252, 254 (FIG. 2) roll and/or slide along the first side 244 of the wobble plate 242, the portion of the wobble plate 242 engaged by the first and second rolling elements 252, 254 is pushed outward, or upward in FIGS. 5A-5H. The opposite portion of the wobble plate 242 is thereby tilted inward, or downward in FIGS. 5A-5H. In FIGS. 5A-5H, the wobble moves or progresses in a counter-clockwise direction when viewed from the second side 248 of the wobble plate 242. As the circular wobbling motion progresses, the wobble plate 242 remains at a fixed angle relative to the X-Y plane (i.e., the central axis of the wobble plate 242 remains at a fixed angle relative to the Z axis).

Referring back to FIG. 4, the wobble plate 242 is angled by the first and second rolling elements 252 (FIG. 2), 254. As a result, a portion of the second elliptically interfacing gear 250 is pushed into engagement with the first elliptically interfacing gear 224 while a portion of the second face gear 246 (on an opposite edge of the wobble plate 242) is pushed into engagement with the first face gear 212. As the first and second rolling elements 252, 254 are rotated about the axis 210, the circular wobbling motion imparted in the wobble plate 242 causes the first face gear 212 and/or the first elliptically interfacing gear 224 to rotate.

Figure 6A:
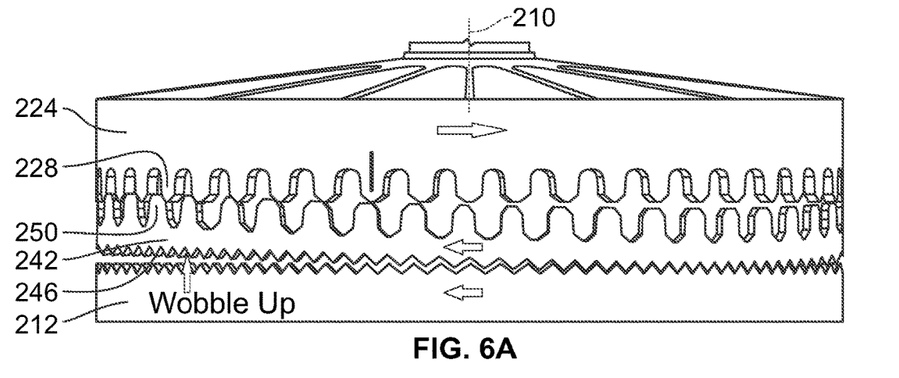
FIGS. 6A-6C illustrate an example sequence of a portion an example circular wobbling motion performed by the example wobble plate of FIGS. 5A-5H in which the wobble motion rotates an example elliptically interfacing gear.
Figure 6B:
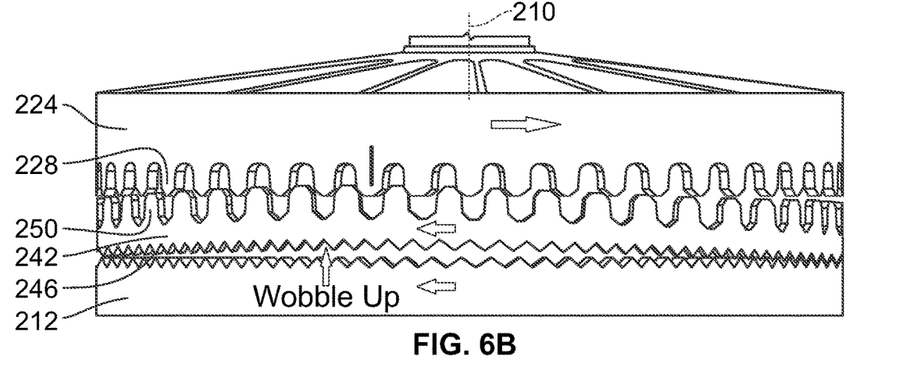
Figure 6C:
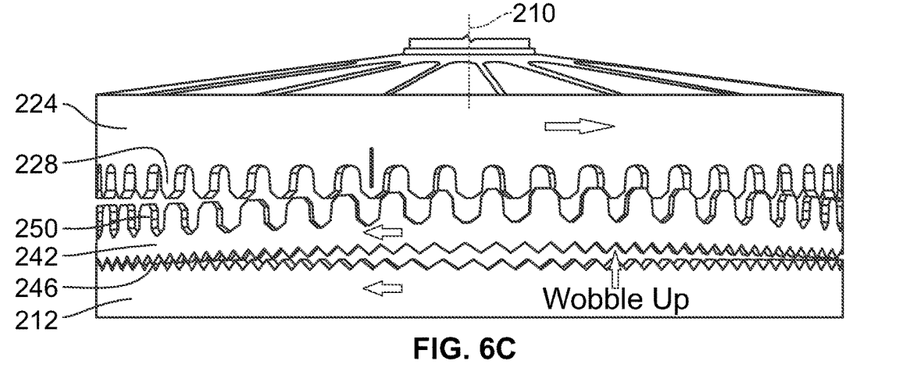

For example, FIGS. 6A-6C illustrate an example sequence of a portion of a circular wobbling motion cycle of the wobble plate 242 from a side view. In FIGS. 6A-6C, the circular wobbling motion progresses from left to right. As the first and second rolling elements 252, 254 (FIG. 2) rotate around the axis 210, the first and second rolling elements 252, 254 push a portion (e.g., one or more teeth) of the second elliptically interfacing gear 250 of the wobble plate 242 outward (upward in FIGS. 6A-6C as shown by the "Wobble Up" arrow) and into engagement with a portion (e.g., one or more teeth) with the teeth 228 of the first elliptically interfacing gear 224. In this example, the first elliptically interfacing gear 224 has one more tooth than the second elliptically interfacing gear 250 on the wobble plate 242. For example, the second elliptically interfacing gear 250 may include 60 teeth and the first elliptically interfacing gear 224 may include 61 teeth. In other examples, the first elliptically interfacing gear 224 have may have more than one additional tooth than the second elliptically interfacing gear 250. While the height and/or shape of the teeth 228 of the first elliptically interfacing gear 224 may be substantially the same as the second elliptically interfacing gear 250, the teeth 228 of the first elliptically interfacing gear 224 are spaced slightly closer together to accommodate one additional tooth as compared to the second elliptically interfacing gear 250. Assuming the circular wobbling motion is moving from left to right in FIGS. 6A-6C, as the portion of the wobble plate 242 engaged with the first elliptically interfacing gear 224 progresses, the teeth of the second elliptically interfacing gear 250 engage and push the teeth 228 of the first elliptically interfacing gear 224 in the direction of the circular wobbling motion (to the right in FIGS. 6A-6C). This is because the spacing between the teeth 228 of the first elliptically interfacing gear 224 are slightly smaller. In other words, because the spacing between the teeth 228 of the first elliptically interfacing gear 224 is slightly smaller, the teeth of the second elliptically interfacing gear 250 do not align perfectly within the spacings of the teeth 228 of the first elliptically interfacing gear 224 (and vice versa). Instead, the teeth of the second elliptically interfacing gear 250 engage the sides of the teeth 228 of the first elliptically interfacing gear 224, which causes the teeth 228 of the first elliptically interfacing gear 224 (and, thus, the first elliptically interfacing gear 224) to be moved in the direction of the circular wobbling motion, which is to the right in FIGS. 6A-6C. As a result, the first elliptically interfacing gear 224 is rotated to the right in FIGS. 6A-6C (as shown by the arrow pointing right in FIGS. 6A-6C). For every circular wobbling motion cycle of the wobble plate 242 (e.g., the cycle shown in FIGS. 5A-5H), the first elliptically interfacing gear 224 is advanced one tooth forward compared to the wobble plate 242 (e.g., a 1/61 rotation). For example, in the illustrated example of FIGS. 6A-6C, a tick mark is shown on one of the teeth 228 of the first elliptically interfacing gear 224. As shown, the first elliptically interfacing gear 224 is rotated to the right in between FIGS. 6A and 6C. Assuming one full wobble cycle has occurred, the tooth with the tick mark would be moved over one tooth on the wobble plate 242. Thus, the circular wobbling motion causes rotation of the first elliptically interfacing gear 224 and, thus, rotation of the second drive shaft 208 (FIG. 2) in the direction of the circular wobbling motion.

In addition to moving the first elliptically interfacing gear 224 to the right in FIGS. 6A-6C, the interaction between the teeth of the second elliptically interfacing gear 250 and the teeth 228 of the first elliptically interfacing gear 224 also pushes the wobble plate 242 in the reverse direction, opposite to the direction of the circular wobbling motion (as shown by the arrow pointing left in FIGS. 6A-6C), due to the principle of least action. In other words, as the portion of the wobble plate 242 is pushed upward into engagement with the first elliptically interfacing gear 224, the wobble plate 242 and the first elliptically interfacing gear 224 are moved in equal and opposite directions (left and right in FIGS. 6A-6C). This interaction causes the wobble plate 242 to rotate about its central axis in the reverse direction (to the left in FIGS. 6A-6H). Thus, the torque and reaction of gear motion is about 90° out of phase.

As mentioned above, while one edge of the wobble plate 242 is pushed upward into engagement with the first elliptically interfacing gear 224 by the first and/or second rolling elements 252, 254, the opposite edge of the wobble plate 242 is tilted in the opposite direction toward the first face gear 212. This occurs because the teeth of the second elliptically interfacing gear 250 do not all align with the teeth 228 of the first elliptically interfacing gear 224. For example, only one of the teeth of the second elliptically interfacing gear 250 may fit within one tooth gap of the first elliptically interfacing gear 224 while certain ones of the teeth in front of and/or behind the tooth engage the sides of the corresponding teeth of the first elliptically interface gear 224 and do not fit within the corresponding gaps. This interaction creates a 4 dimensional constraint (X, Y, Z and rotation about Z) that forces the wobble plate 242 to achieve a specific tilt and undergo a specific motion when driven by the power source 204. As a result, a portion (e.g., one or more teeth) of the second face gear 246 of the wobble plate 242 are pushed into engagement with a portion (e.g., one or more teeth) of the teeth 216 of the first face gear 212. The first face gear 212 and the second face gear 246 on the wobble plate 242 have the same number of teeth (i.e., are in a 1:1 ratio). For example, the first face gear 212 and the second face gear 246 may each have 60 teeth. As a result, as the wobble plate 242 rotates in the counter-direction, the first face gear 212 rotates with the wobble plate 242 in the same direction, in a 1:1 ratio.

Figure 7A:
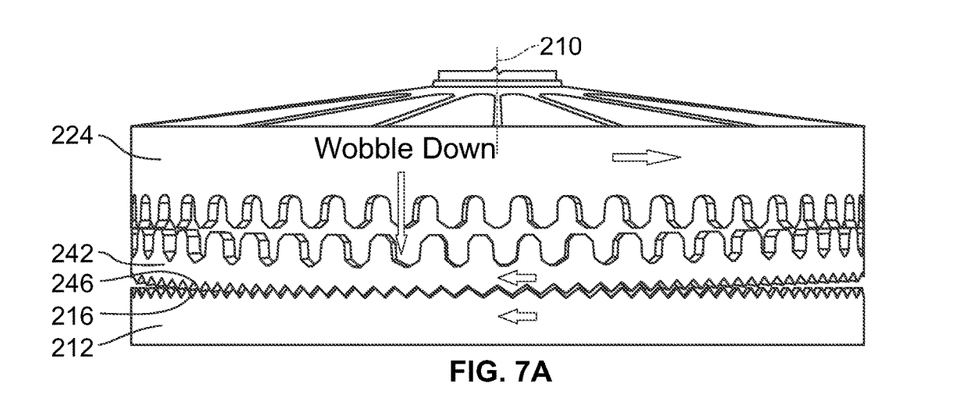
FIGS. 7A-7C illustrate another example sequence of a portion of the example circular wobbling motion of FIGS. 6A-6C in which the wobble motion rotates an example face gear.
Figure 7B:
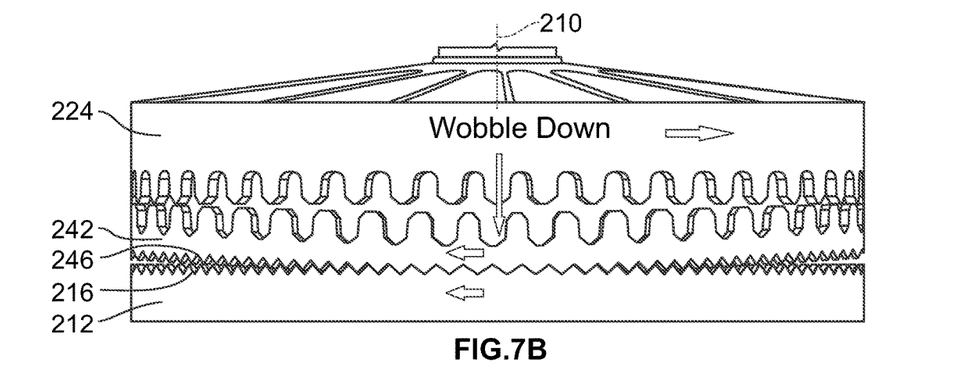
Figure 7C:
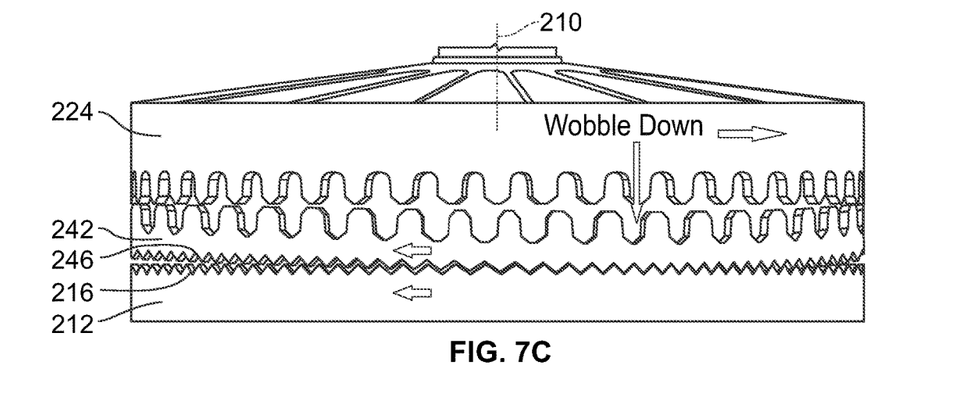

For example, FIGS. 7A-7C illustrate an example sequence of a portion of a circular wobbling motion cycle of the wobble plate 242 from a side view. In FIGS. 7A-7C, the circular wobbling motion progresses from left to right. As the circular wobbling motion progresses, a portion of the wobble plate 242 is pushed downward into engagement with a portion of the first face gear 212 (as shown by the "Wobble Down" arrow in FIGS. 7A-7C). Thus, at least a portion of the teeth of the second face gear 246 are engaged with a portion of the teeth 216 of the first face gear 212. As mentioned above, the wobble plate 242 is rotated (as shown by the arrowing pointing to the left in FIGS. 7A-7C) in a direction that is opposite to the direction of the circular wobbling motion. As a result, the portion of the second face gear 246 engaged with the teeth 216 of the first face gear 212 drives the first face gear 212 in the same direction as the wobble plate 242 (as shown by the arrowing pointing to the left in FIGS. 7A-7C). Thus, the first face gear 212 is rotated in one direction, and the first elliptically interfacing gear 224 is rotated in the other direction, thereby rotating the first and second drive shafts 206, 208 in opposite directions.

In some examples, each cycle of the circular wobbling motion of the wobble plate 242 causes the first face gear 212 to advance one half of a tooth in one direction and the first elliptically interfacing gear 224 to advance one half of a tooth in the opposite direction, thereby causing the first face gear 212 and the first elliptically interfacing gear 224 to advance one tooth in the opposite direction relative to each other. Assuming that the loads on the first and second drive shafts 206, 208 are substantially equal, for example, the movement of the wobble plate 242 is split between rotating the first face gear 212 in one direction and the first elliptically interfacing gear 224 in the opposite direction. With substantially equal loads, the wobble plate 242 (and, thus, the first face gear 212) is moved an equal distance in the opposite direction as the first elliptically interfacing gear 224 (i.e., splitting the difference of the movement), via the principle of least action. Thus, with each cycle, the first and second drive shafts 206, 208 are advanced the same amount in opposite directions, thereby rotating the first and second drive shafts 206, 208 at substantially the same speed (rotations-per-minute (RPMs)). Further, the wobble plate 242 provides substantially equal but opposite torque to the first face gear 212 and the first elliptically interfacing gear 224 and, thus, the transmission 202 provide substantially the equal but opposite torque to the first and second drive shafts 206, 208.

While in the illustrated examples of FIGS. 6A-6C and 7A-7C, the circular wobbling motion progresses from left to right, in other examples, the output shaft 406 (FIG. 4) of the power source 204 (FIG. 4) can be rotated in the opposite direction, which would drive the circular wobbling motion in the opposite direction. As such, the first face gear 212 and the first elliptically interfacing gear 224 would be rotated in opposite direction. Thus, the example transmission 202 can rotate the first and second drive shafts 206-208 in either directions.

The example transmission 202 of FIGS. 2-4 is also advantageous because if one of the first or second drive shafts 206, 208 becomes jammed, stuck, and/or otherwise fails, the wobble plate 242 continues to rotate the other of the first or second drive shafts 206, 208. Therefore, failure of one of the first or second drive shafts 206, 208 does not inhibit rotation of the other of the first or second drive shafts 206, 208. Thus, even if one of the first of second drive shafts 206, 208 fails, the transmission 202 can still provide rotational power to the other of the first or second drive shafts 206, 208 and, thus, the drive apparatus 200 is still operational for its intended use. Further, by enabling the wobble plate 242 to continue to move in the circular wobbling motion, failure of the first or second drive shafts 206, 208 does not cease motion of the power source 204 and, thus, would not stall the power source 204 (e.g., a combustion engine).

For example, referring back to FIGS. 6A-6C, assume the first drive shaft 206 (FIG. 2) is stuck or jammed such that the first face gear 212 remains stationary. Because the first face gear 212 and the second face gear 246 have the same number of teeth, the teeth of the second face gear 246 remain aligned or matched with the same teeth on the first face gear 212. In other words, the second face gear 246 is not able to advance forward relative to the first face gear 212. Thus, as the wobble plate 242 moves in the circular wobbling motion, the wobble plate 242 does not rotate about its central axis. Instead, the wobble plate 242 only wobbles in place, similar to the cycle shown in FIGS. 5A-5H. In this example, the second face gear 246 engages the first face gear 212 up and down, but does not rotate. As the wobble plate 242 moves in the circular wobbling motion, the second elliptically interfacing gear 250 engages the first elliptically interfacing gear 224, thereby pushing the teeth 228 to the right and causing the first elliptically interfacing gear 224 to rotate, as discussed above in connection with FIGS. 6A-6C. However, because the wobble plate 242 is not able to rotate in the reverse direction (because the wobble plate 242 is virtually locked by the first face gear 212), the first elliptically interfacing gear 224 is rotated one full tooth forward with each cycle of the wobble plate 242, instead of only a half of tooth as seen when both the first face gear 212 and the first elliptically interfacing gear 224 can rotate. Thus, while the torque remains the same, the speed of the second drive shaft 208 (FIG. 2) is doubled.

The opposite is also true regarding the first and second drive shafts 206, 208. For example, assume the second drive shaft 208 (202) is stuck or jammed such that the first elliptically interfacing gear 224 remains stationary. As the second elliptically interfacing gear 250 is pushed into the first elliptically interfacing gear 224, the wobble plate 242 is forced to rotate in a direction opposite of the circular wobbling motion (to the left in FIGS. 6A-6C). As a result, the portion of the second face gear 246 of the wobble plate 242 that that engages the first face gear 212 rotates the first face gear 212 in the same direction as the wobble plate 242. Thus, the first face gear 212 (and, thus, the first drive shaft 206) is rotated in the reverse direction of the circular wobbling motion. However, because the first elliptically interfacing gear 224 is not moved and remains stationary, the wobble plate 242 is rotated one full tooth in reverse direction with each cycle of the wobble plate 242. Thus, the speed of the first drive shaft 206 (FIG. 2) is doubled. While torque remains the same, the speed increases by a factor of two. Furthermore, if one of the first or second drive shafts 206, 208 slows down (e.g., because of an increased load), the rotational speed of the other of the first or second drive shafts 206, 208 increases proportionally, thus achieving an asymmetrically balanced system. As such, the torque of each drive shaft remains the same, power is conserved, and the transmission 202 continues to operate.

In some examples, the transmission 202 may achieves a relatively high gear ratio of about 20-120:1. In some examples, a gear ratio of 60:1 is used. In other words, for every 60 rotations of the output shaft 406 of the power source 204, the first and second drives shafts 206, 208 rotate once. In other examples, the gear ratio may be higher or lower. For example, the number of teeth on the first face gear 212, the first elliptically interfacing gear 224, the second face gear 246, and/or the second elliptically interfacing gear 250 can be changed to affect the gear ratio and the rotational speeds.

While in the illustrated example, the second face gear 246 of the wobble plate 242 has the same number of teeth as the first face gear 212 and, thus, rotates in the same direction as the first face gear 212, in other examples, the first face gear and the first elliptically interfacing gear 224 may be reversed. For example, the first face gear 212 of the first drive shaft 206 may have one extra tooth than the wobble plate 242, and the opposite side of the wobble plate 242 may have the same number of teeth as the first elliptically interfacing gear 224 of the second drive shaft 208. As a result, the wobble plate 242 would rotate in the same direction as the second drive shaft 208, and the circular wobbling motion of the wobble plate 242 would drive the first drive shaft 206 in the opposite direction.

From the foregoing, it will be appreciated that the above disclosed apparatus, systems and article of manufacture achieve equal torque and rotational speeds of counter-rotating coaxial drive shafts. Examples disclosed herein may be advantageously used with counter-rotating propeller systems where two propellers are to be rotated in opposite directions. Unlike known counter-rotating transmissions that require a complex systems of gears, example transmissions disclosed herein may employ only a single driven element (e.g., the wobble plate) constrained between the two output shafts. As such, these example single-stage transmissions are less expensive and easier to manufacture and assemble than known transmissions. Further, example transmissions disclosed herein are more compact or smaller, because the transmissions do not need to accommodate a large number of gears like in known transmissions. Thus, example transmissions disclosed herein may be utilized in more applications.

Although certain example apparatus, systems, and articles of manufacture have been disclosed herein, the scope of coverage of this patent is not limited thereto. On the contrary, this patent covers all methods, systems, and articles of manufacture fairly falling within the scope of the claims of this patent.

What is claimed is:
1. An apparatus comprising:
a first face gear coupled to a first drive shaft;
a first elliptically interfacing gear coupled to a second drive shaft and facing toward the first face gear, the second drive shaft disposed within and coaxially aligned with the first drive shaft along a rotational axis; and
a wobble plate disposed between the first face gear and the first elliptically interfacing gear, the wobble plate having a second face gear on a first side of the wobble plate engaged with the first face gear and a second elliptically interfacing gear on a second side of the wobble plate engaged with the first elliptically interfacing gear, a central portion of the wobble plate not engaged with a fulcrum, the wobble plate to rotate the first face gear and the first elliptically interfacing gear in opposite directions.
2. The apparatus of claim 1, wherein the first elliptically interfacing gear has one more tooth than the second elliptically interfacing gear on the second side of the wobble plate.
3. The apparatus of claim 2, wherein the first face gear and the second face gear have the same number of teeth.
4. The apparatus of claim 1, further including a rolling element engaged with the first side of the wobble plate, the rolling element offset from the rotational axis, the rolling element rotatable around the rotational axis to cause a circular wobbling motion in the wobble plate.

5. The apparatus of claim 4, wherein, when the rolling element causes the wobble plate to move in the circular wobbling motion, the wobble plate rotates in a first direction, which rotates the first face gear in the same direction.

6. The apparatus of claim 5, wherein, when the rolling element causes the wobble plate to move in the circular wobbling motion, the wobble plate rotates the first elliptically interfacing gear in a second direction opposite the first direction.

7. The apparatus of claim 4, further including an input drive plate rotatable about the rotational axis, the rolling element coupled to and extending from the input drive plate.

8. The apparatus of claim 7, further including a power source to rotate the input drive plate about the rotational axis.

9. The apparatus of claim 7, wherein the rolling element is a first rolling element, further including a second rolling element coupled to an extending from the input drive plate, the second rolling element engaged with the first side of the wobble plate.

10. The apparatus of claim 1, wherein the first face gear and the first elliptically interfacing gear have differently shaped teeth.

11. The apparatus of claim 1, wherein the first face gear and the first drive shaft form a cavity, the first elliptically interfacing gear and the wobble plate disposed within the cavity.

12. The apparatus of claim 11, wherein the first face gear is ring-shaped, further including a rolling element rotatable about a central axis of the wobble plate, the rolling element extending through an opening of the first face gear and engaging the first side of the wobble plate.

13. The apparatus of claim 1, wherein the first drive shaft includes a first section with a first diameter and a second section with a second diameter smaller than the first diameter, the first face gear coupled to the first section of the first drive shaft such that a cavity is formed between the first face gear and the first section of the first drive shaft.

14. The apparatus of claim 13, wherein the first elliptically interfacing gear and the wobble plate are disposed in the cavity.

15. A counter-rotating propeller system comprising:
a first propeller and a second propeller rotatable about a common rotational axis;
a transmission to rotate the first propeller and the second propeller in opposite directions, the transmission including:
a first drive shaft coupled to the first propeller;
a second drive shaft coupled to the second propeller; and
a wobble plate disposed between the first drive shaft and the second drive shaft, a central portion of the wobble plate not engaged with a fulcrum; and
a power source to move the wobble plate in a circular wobbling motion to rotate the first and second drive shafts in opposite directions.

16. The counter-rotating propeller system of claim 15, further including a rolling element, the power source to rotate the rolling element along a circular path on a side of the wobble plate.

17. The counter-rotating propeller system of claim 15, wherein the wobble plate has a face gear on a first side of the wobble plate and an elliptically interfacing gear on a second side of the wobble plate opposite the first side, the face gear and the elliptically interfacing gear having differently shaped teeth.

18. An apparatus comprising:
a first face gear facing a first elliptically interfacing gear; and
a wobble plate disposed between the first face gear and the first elliptically interfacing gear, the wobble plate having a second face gear on a first side of the wobble plate engaged with the first face gear and a second elliptically interfacing gear on a second side of the wobble plate engaged with the first elliptically interfacing gear, a central portion of the wobble plate not engaged with a fulcrum, the first face gear and the second face gear having the same number of teeth, the first elliptically interfacing gear having more teeth than the second elliptically interfacing gear, the wobble plate configured to, when driven in a circular wobbling motion, rotate the first face gear and the first elliptically interfacing gear at substantially the same speed in opposite directions.

19. The apparatus of claim 18, wherein the first face gear and the first elliptically interfacing gear have differently shaped teeth.

20. The apparatus of claim 18, wherein the first face gear is a ring-shaped disk with an opening, further including a means for moving the wobble plate in the circular wobbling motion that extends through the opening.

* * * * *